US012771802B2

(12) United States Patent
Ogi et al.

(10) Patent No.: US 12,771,802 B2
(45) Date of Patent: Oct. 20, 2026

(54) INFORMATION PROCESSING SYSTEM, IMAGE CAPTURE APPARATUS, INFORMATION PROCESSING METHOD, AND STORAGE MEDIUM

(71) Applicant: CANON KABUSHIKI KAISHA, Tokyo (JP)

(72) Inventors: Kohei Ogi, Kanagawa (JP); Yosuke Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 18/958,322

(22) Filed: Nov. 25, 2024

(65) Prior Publication Data

US 2025/0175572 A1 May 29, 2025

(30) Foreign Application Priority Data

Nov. 27, 2023 (JP) ................................ 2023-200150

(51) Int. Cl.
*H04N 5/21* (2006.01)

(52) U.S. Cl.
CPC .................................... *H04N 5/21* (2013.01)

(58) Field of Classification Search
CPC .. H04N 5/21; H04N 7/18; H04N 5/77; H04N 23/80
See application file for complete search history.

(56) References Cited

U.S. PATENT DOCUMENTS

2012/0242844 A1* 9/2012 Walker .................. H04N 23/66 348/207.1
2022/0279111 A1* 9/2022 Li ......................... H04N 7/183

FOREIGN PATENT DOCUMENTS

JP 2016058994 A 4/2016

* cited by examiner

*Primary Examiner* — Yogesh K Aggarwal
(74) *Attorney, Agent, or Firm* — Canon.U.S.A., Inc. IP Division

(57) ABSTRACT

An information processing system includes an image processing apparatus that executes image processing to improve an image quality of an image captured by an image capture apparatus, and a first storage device that stores the captured image, where the image processing apparatus determines whether the image processing is to be executed, and the first storage device stores the captured image when it is determined that the image processing is to be executed, and the first storage device avoids storing the captured image when it is determined that the image processing is not to be executed.

15 Claims, 14 Drawing Sheets

INFORMATION PROCESSING SYSTEM, IMAGE CAPTURE APPARATUS, INFORMATION PROCESSING METHOD, AND STORAGE MEDIUM

BACKGROUND

Field

The present disclosure relates to an information processing system, an image capture apparatus, an information processing method, and a storage medium.

Description of the Related Art

A monitoring camera system has been proposed that is configured to generate video obtained by adopting image quality improvement processing based on image capture data on a monitoring camera side under a poor visibility environment such as at night or when fog or haze is present.

Japanese Patent Laid-Open No. 2016-58994 discloses a technique of generating low image quality video data and high image quality video data at the time of video shooting and switching use of either the low image quality video data or the high image quality video as video data to be distributed based on an operation of a user.

SUMMARY

An information processing system includes an image processing apparatus configured to execute image processing to improve an image quality of an image captured by an image capture apparatus, and a first storage device configured to store the captured image, wherein the image processing apparatus determines whether the image processing is to be executed, and the first storage device stores the captured image when it is determined that the image processing is to be executed, and the first storage device avoids storing the captured image when it is determined that the image processing is not to be executed.

Further features of the present disclosure will become apparent from the following description of exemplary embodiments with reference to the attached drawings.

DESCRIPTION OF THE EMBODIMENTS

Hereinafter, the present disclosure will be described in detail by way of embodiments with reference to the accompanying drawings. Configurations illustrated in the following embodiments are merely examples, and the present disclosure is not limited to the illustrated configurations.

A plurality of features are described in the embodiments, but not all the plurality of these features are necessarily essential, and some features can be optionally combined. In the accompanying drawings, the same reference signs are assigned to the same or similar configurations, and duplicated descriptions thereof are not repeated.

First Embodiment

System Configuration

Figure 1:
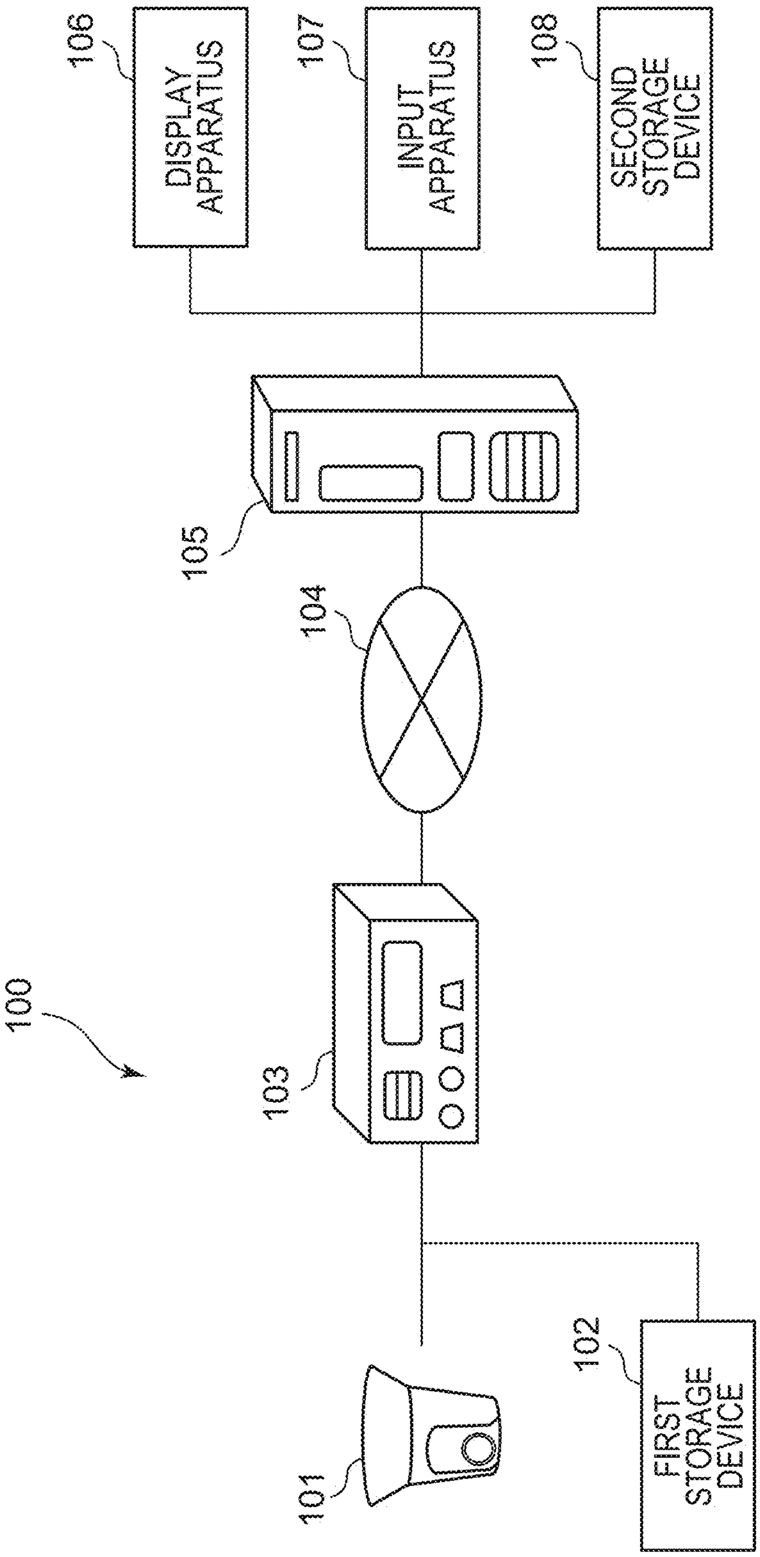
FIG. 1 illustrates a system configuration of an information processing system.

FIG. 1 illustrates an example of a configuration of an information processing system according to the present embodiment. An information processing system 100 includes an image capture apparatus 101, a first storage device 102, an image processing apparatus 103, a network 104, an information processing apparatus 105, a display apparatus 106, an input apparatus 107, and a second storage device 108.

The image capture apparatus 101 is an apparatus configured to capture an image of a subject. The image captured by the image capture apparatus 101 is output to the image processing apparatus 103.

The first storage device 102 is a device configured to store the image captured by the image capture apparatus 101. The first storage device 102 is, for example, a hard disc drive (HDD), a solid state drive (SSD), or the like.

An external storage device can be used as a device configured to play a similar role. The external storage device can be realized by, for example, media (recording media) and an external storage drive configured to realize accesses to the media. For example, a flexible disc (FD), a CD-ROM, a DVD, a USB memory, an MO, a flash memory, and the like have been proposed as such media. In addition, the external storage device can be a server apparatus or the like connected via a network, or the external storage device can be integrated into the image capture apparatus 101.

The image processing apparatus 103 executes an image quality processing to improve an image quality. The image quality improvement processing refers to noise reduction (NR) processing, fog and haze reduction, super resolution, high dynamic range (HDR), or fluctuation reduction, but is not limited to these types of processing. In addition, the image processing apparatus 103 performs encoding processing (hereinafter, referred to as compression processing) on the image captured by the image capture apparatus 101 or the image on which the image quality improvement processing has been executed. Known methods can be used as an encoding technique, and the compression processing can be executed based on a predetermined file formats such as Motion Jpeg, H264, or H265. The image processing apparatus 103 transmits the image to the information processing apparatus 105 via the network 104. That is, the image processing apparatus 103 can transmit the image on which at least one of the image quality improvement processing or the compression processing has been executed or the image captured by the image capture apparatus 101 as it is without performing any of the processing.

The network 104 operates based on, for example, a communication standard such as Ethernet. The network 104 includes one or more routers, one or more switches, one or more cables, or the like. The network 104 can be any network without limitations on the communication standard, scale, or configuration as long as communication between the image processing apparatus 103 and the information processing apparatus 105 can be executed. The image processing apparatus 103 and the information processing apparatus 105 communicate with each other via the network 104.

The information processing apparatus 105 receives the image transmitted from the image processing apparatus 103. The information processing apparatus 105 is connected to the display apparatus 106, the input apparatus 107, and the second storage device 108. The information processing apparatus 105 outputs the received image to the display apparatus 106, where the display apparatus 106 displays the image and executes an operation based on input information from a user via the input apparatus 107. The information processing apparatus 105 can execute various image processing including the compression processing, the image quality improvement processing, and decoding processing to be performed in the image processing apparatus 103. That is, the information processing apparatus 105 can receive the image captured by the image capture apparatus 101 from the image processing apparatus 103 as it is and execute the image quality improvement processing of the image processing apparatus 103.

The display apparatus 106 is an apparatus including a monitor or the like configured to display an image input from the information processing apparatus 105. The input apparatus 107 is a keyboard, a mouse, or the like and serves as an interface configured to receive operation information of the information processing apparatus 105, the image processing apparatus 103, and the image capture apparatus 101 as an input.

The second storage device 108 is a device similar to the first storage device 102. The second storage device 108 stores the image received from the image processing apparatus 103 or the image on which the decoding processing, the compression processing, or the image quality improvement processing has been performed by the information processing apparatus 105.

Hardware Configuration of Image Capture Apparatus

Figure 2A:
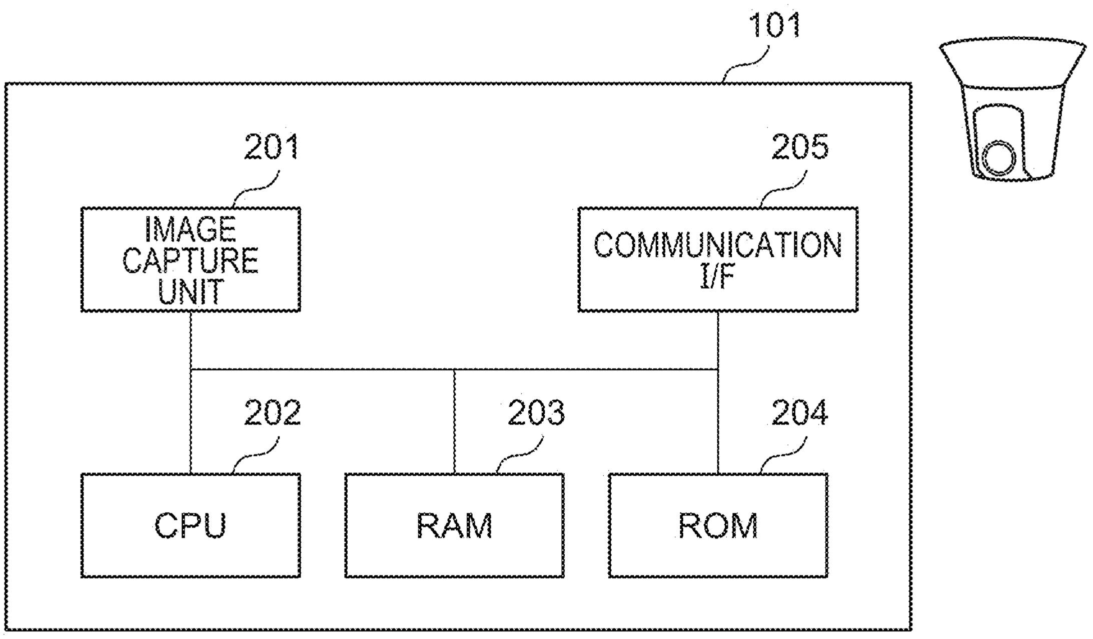
FIGS. 2A and 2B illustrate a hardware configuration and a functional configuration of an image capture apparatus.

FIG. 2A illustrates a hardware configuration of the image capture apparatus 101. The image capture apparatus 101 includes an image capture unit 201, a CPU 202, a RAM 203, a ROM 204, and a communication I/F 205.

The image capture unit 201 includes an image capture optical system including at least one or more lenses and an image capture element. The image capture unit 201 captures an image of the subject and outputs the image as an electric signal. The at least one or more lenses include, for example, a zoom lens, a focus lens, an image stabilizer lens, and the like. The image capture optical system uses the above-described lens to focus light on the image capture element and form the image of the subject and performs change of a focus position or the like. The image capture element converts the light of the image of the subject that has been received on an image sensing surface into an electric signal to be output.

The CPU 202 is a central processing unit configured to control the image capture apparatus 101. The RAM 203 is a random access memory configured to provide a work area to be used when the CPU 202 executes processing. The RAM 203 also functions as a frame memory or functions as a buffer memory.

The ROM 204 is a read only memory configured to store a program for the CPU 202 to control the image capture apparatus 101 or the like.

The communication I/F 205 is an interface configured to output or transmit the captured image to the first storage device 102, the image processing apparatus 103, or the like. The communication I/F 205 is based on a signal transmission standard such as, for example, a serial digital interface (SDI). The communication I/F 205 can be a local area network (LAN) terminal configured to communicate with the information processing apparatus 105 via a network.

Functional Configuration of Image Capture Apparatus

Figure 2B:
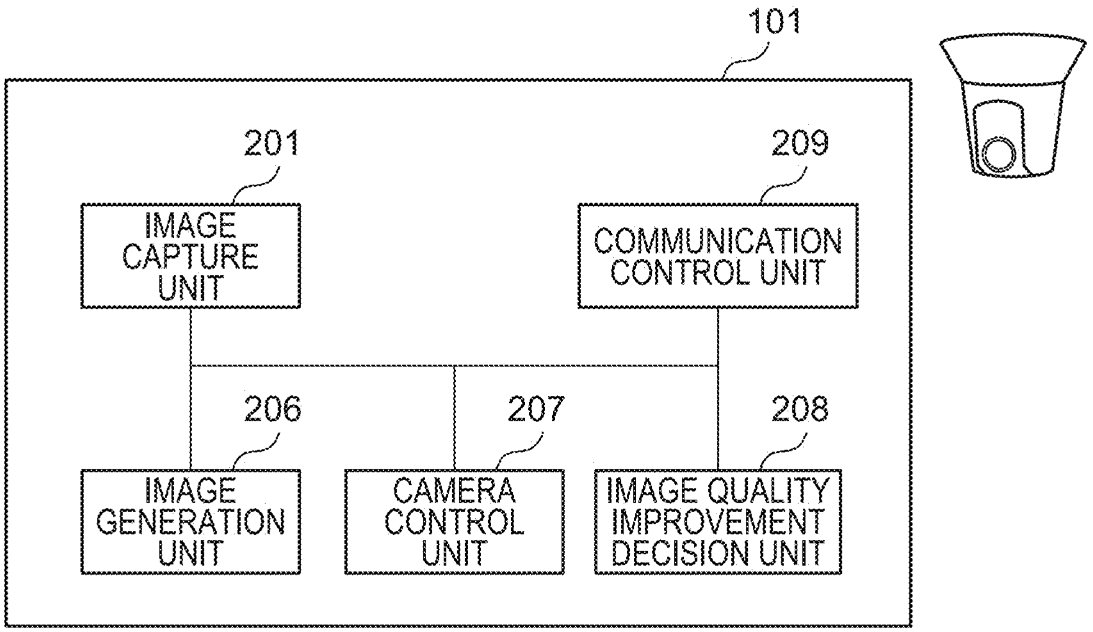

FIG. 2B illustrates a functional configuration of the image capture apparatus 101. The same reference signs are assigned to the functions realized by the hardware among each function illustrated in FIG. 2B, and the descriptions thereof are not repeated.

The image capture apparatus 101 includes the image capture unit 201, an image generation unit 206, a camera control unit 207, an image quality improvement decision unit 208, and a communication control unit 209.

The image generation unit 206 converts the electric signal that is an analog signal output by the image capture unit 201 into a digital signal to generate a RAW image. The camera control unit 207 performs control, such as zoom control, focus control, exposure control, and the like, on the image capture apparatus 101. In addition, the image generation unit 206 can execute various development processing including color conversion processing to output the RAW image through the SDI. The image generation unit 206 can output the RAW image or can output the image on which the above-described development processing has been executed.

The image quality improvement decision unit 208 determines whether the image generated by the image generation unit 206 is an image that needs to be subjected to the image quality improvement processing by the image processing apparatus 103. The determination can be based on the generated image. For example, the determination can be based on a parameter related to noise of the generated image. The image quality improvement decision unit 208 also performs a determination whether a predetermined condition is met when it is determined that the image quality improvement processing is not needed. Herein, the predetermined condition is a condition related to at least one of an amount of noise, a gain, a contrast, a fluctuation, or a size of the subject of the generated image.

A threshold is set for a parameter indicating each element, and a determination is performed whether the parameter is greater than or equal to the threshold. For example, whether the gain is greater than or equal to the threshold or a contrast evaluation value indicating the contrast of the image is greater than or equal to the threshold. This enables determining whether the predetermined condition is met with regard to the image for which it is determined that the image quality improvement processing is not needed. A result of the determination by the image quality improvement decision unit 208 can be transmitted to the image processing apparatus 103 or the information processing apparatus 105.

The communication control unit 209 controls the communication of the image capture apparatus 101. Specifically, a transmission frequency or the number of times to transmit the image generated by the image generation unit 206 is changed, traffic of the image capture apparatus 101 is controlled, or a communication destination of the image capture apparatus 101 is controlled.

Hardware Configuration of Image Processing Apparatus

Figure 3:
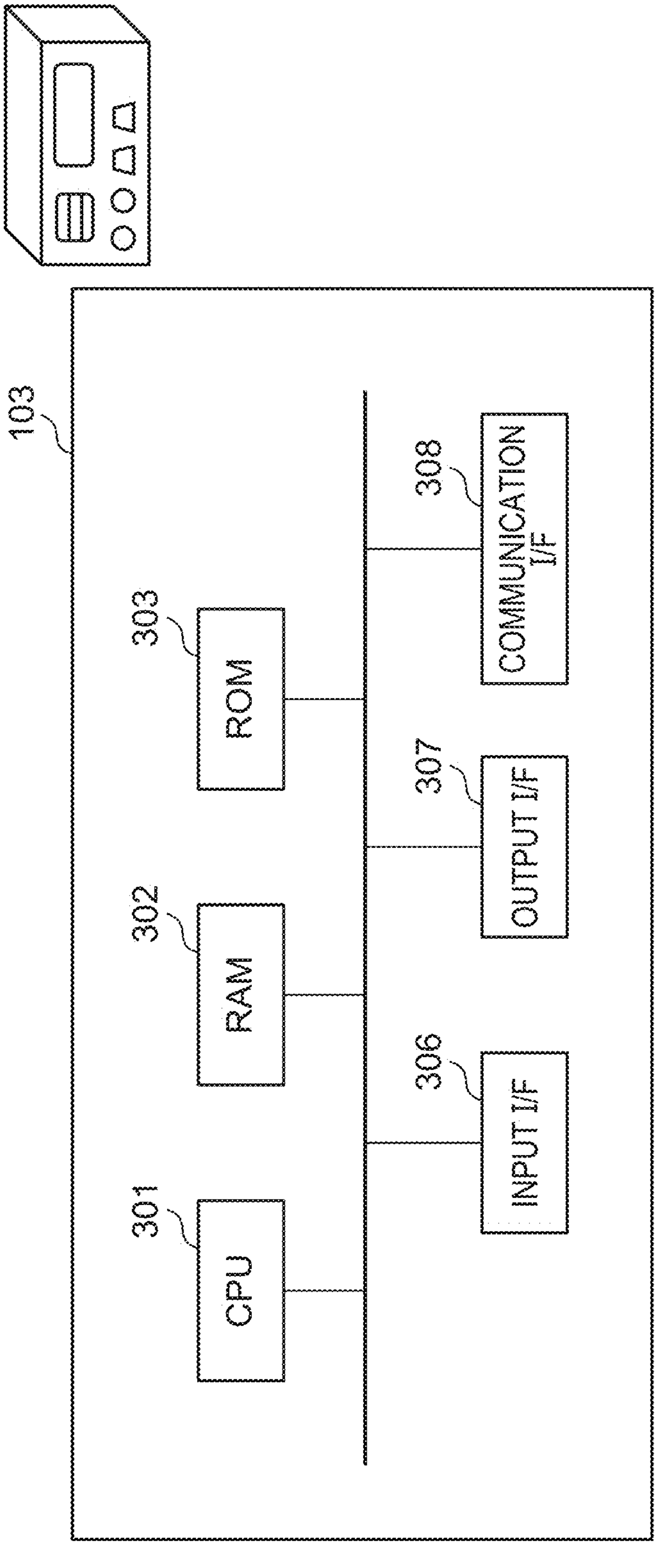
FIG. 3 illustrates a hardware configuration of an image processing apparatus.

FIG. 3 illustrates a hardware configuration of the image processing apparatus 103. The image processing apparatus 103 includes a CPU 301, a RAM 302, a ROM 303, an input I/F 306, an output I/F 307, and a communication I/F 308.

The CPU 301 is a central processing unit configured to control the image processing apparatus 103. The RAM 302 provides a work area used when the CPU 301 executes the processing. The RAM 302 also functions as a frame memory or functions as a buffer memory.

The ROM 303 stores a program for the CPU 301 to control the image processing apparatus 103 or the like. For example, a program for executing the image quality improvement processing or the compression processing or the like is stored in the ROM 303.

The input I/F 306 is an interface configured to accept an input to the image processing apparatus 103. The input I/F 306 accepts, for example, the image output from the image capture apparatus 101, instruction information regarding the image capture apparatus 101 that has been output from the information processing apparatus 105, or the like. Alternatively, the input I/F 306 is a terminal configured to establish connection with an input apparatus such as a keyboard, a mouse, or an SDI terminal configured to receive an image (SDI image) output via the SDI.

The output I/F 307 is an interface configured to output an image on which the image quality improvement processing, the compression processing, or the like has been executed by the image processing apparatus 103 or various parameters in the image quality improvement processing. The output I/F 307 can be an SDI terminal or a USB terminal. An output apparatus such as a monitor can be connected to the output I/F 307.

The communication I/F 308 is an interface configured to realize communication with the information processing apparatus 105 via the network 104. The communication I/F 308 is, for example, a terminal configured to establish connection with a LAN cable.

Hardware Configuration of Information Processing Apparatus

Figure 4:
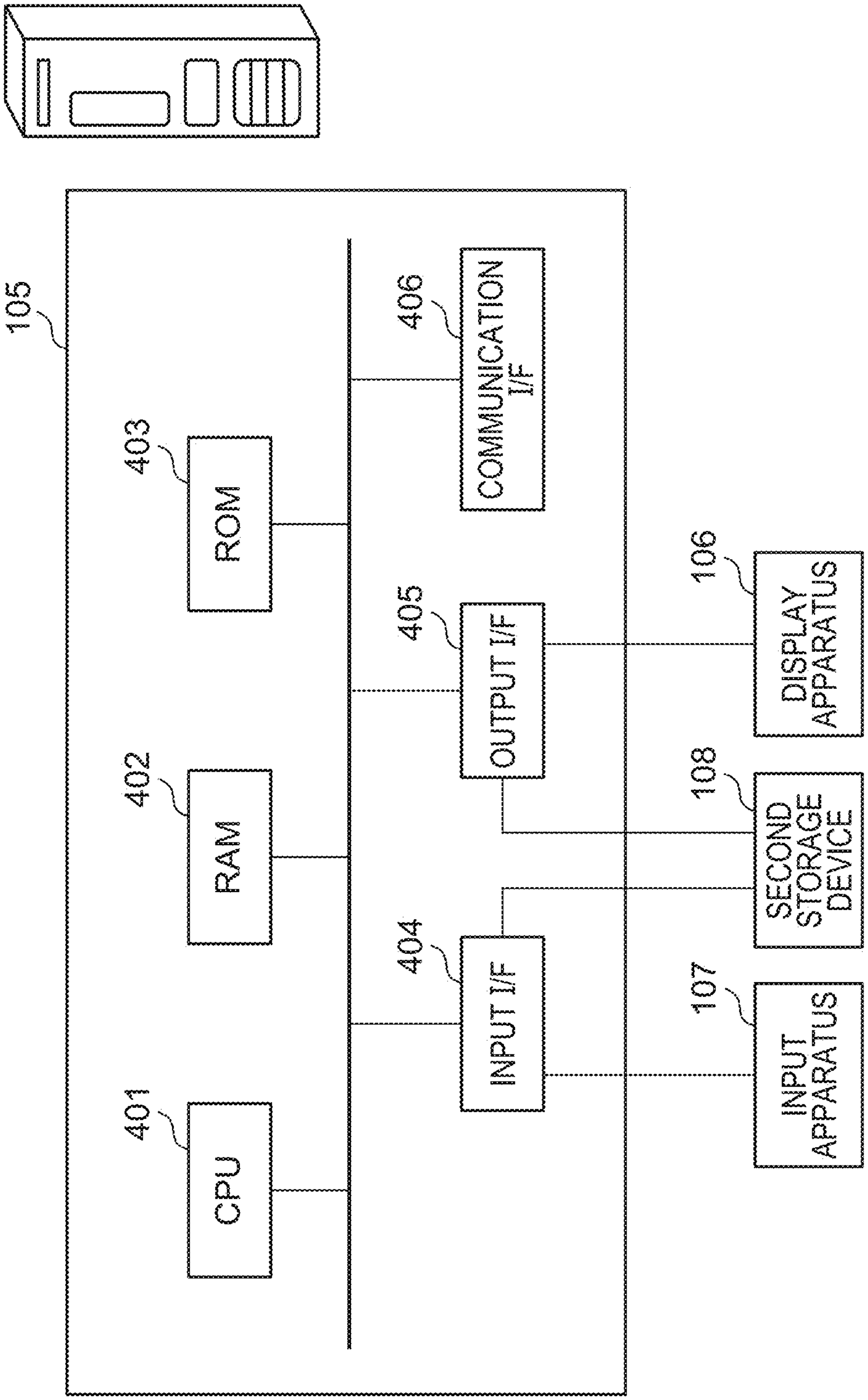
FIG. 4 illustrates a hardware configuration of an information processing apparatus.

FIG. 4 illustrates a hardware configuration of the information processing apparatus 105 according to the present embodiment. The information processing apparatus 105 includes a CPU 401, a RAM 402, a ROM 403, an input I/F 404, an output I/F 405, and a communication I/F 406. Regarding the roles of these respective components, the descriptions that are redundant with those of the image processing apparatus 103 are not repeated.

The input I/F 404 is connected to the input apparatus 107 and the second storage device 108 and accepts an instruction from the user via the input apparatus 107. The input I/F 404 also accepts the image stored in the second storage device 108 as an input.

The output I/F 405 is connected to the display apparatus 106 and the second storage device 108, and the image output from the information processing apparatus 105 via the output I/F 405 can be displayed on the display apparatus 106. The image on which the image processing has been executed by the information processing apparatus 105 is stored in the second storage device 108 via the output I/F 405. As described above, the second storage device 108 stores the image captured by the image capture apparatus 101 (or the image on which the image quality improvement processing or the encoding processing has been performed by the image processing apparatus 103). Therefore, the second storage device 108 can store the RAW image or the image on which the development processing has been performed.

Functional Configuration of Information Processing Apparatus

Figure 5:
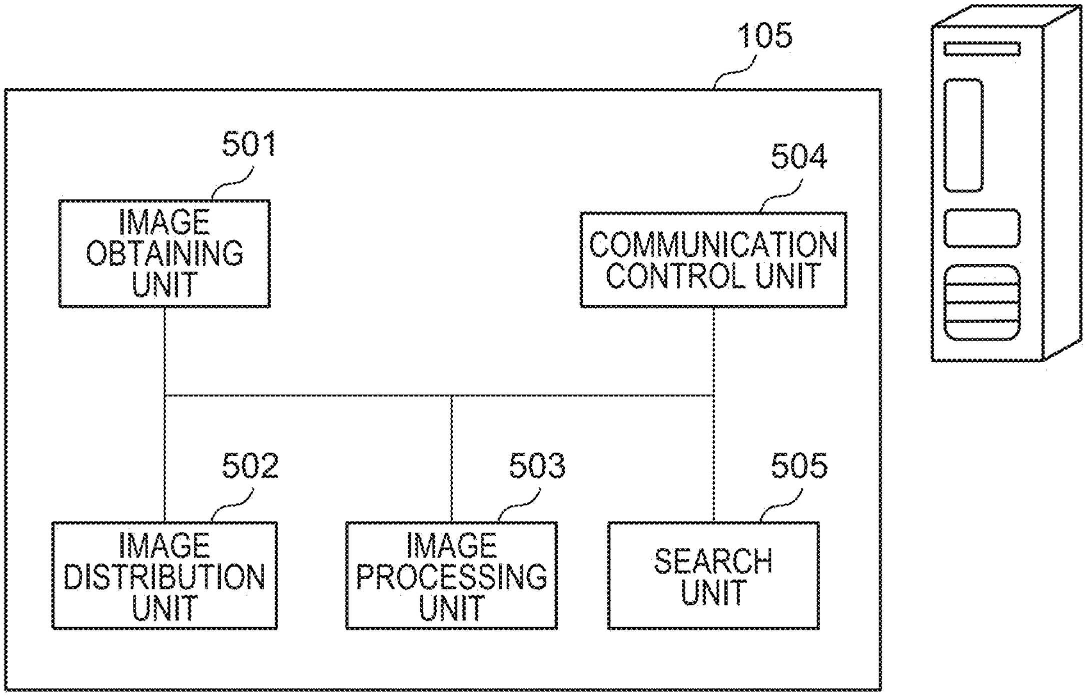
FIG. 5 illustrates a functional configuration of the information processing apparatus.

FIG. 5 is a block diagram illustrating a functional configuration of the information processing apparatus 105 according to the present embodiment. The information processing apparatus 105 includes an image obtaining unit 501, an image distribution unit 502, an image processing unit 503, a communication control unit 504, and a search unit 505. Each function illustrated in FIG. 5 can be realized when the program stored in the RAM 402 or the ROM 403 is executed by the CPU 401.

The image obtaining unit 501 obtains an image from the image processing apparatus 103 or the second storage device 108.

The image captured by the image capture apparatus 101 (including the RAW image) or the image on which at least one of the image quality improvement processing and the encoding processing has been executed by the image processing apparatus 103 is obtained.

The image distribution unit 502 reads out an image designated by the user from the second storage device 108 and executes processing of distributing the image to the display apparatus 106.

The image processing unit 503 reads out an image designated by the user from the second storage device 108 and executes the image quality improvement processing based on a parameter setting designated by the user. The image on which the image quality improvement processing has been executed is output to the second storage device 108 to be stored.

The communication control unit 504 transmits and receives data to and from a device connected via the network 104.

The search unit 505 analyzes the image received from the image processing apparatus 103 or the image output from the image processing unit 503 and searches for a similar image or an image with a similar analysis result from among the images stored in the second storage device 108.

Description on Operation

Figure 6A:
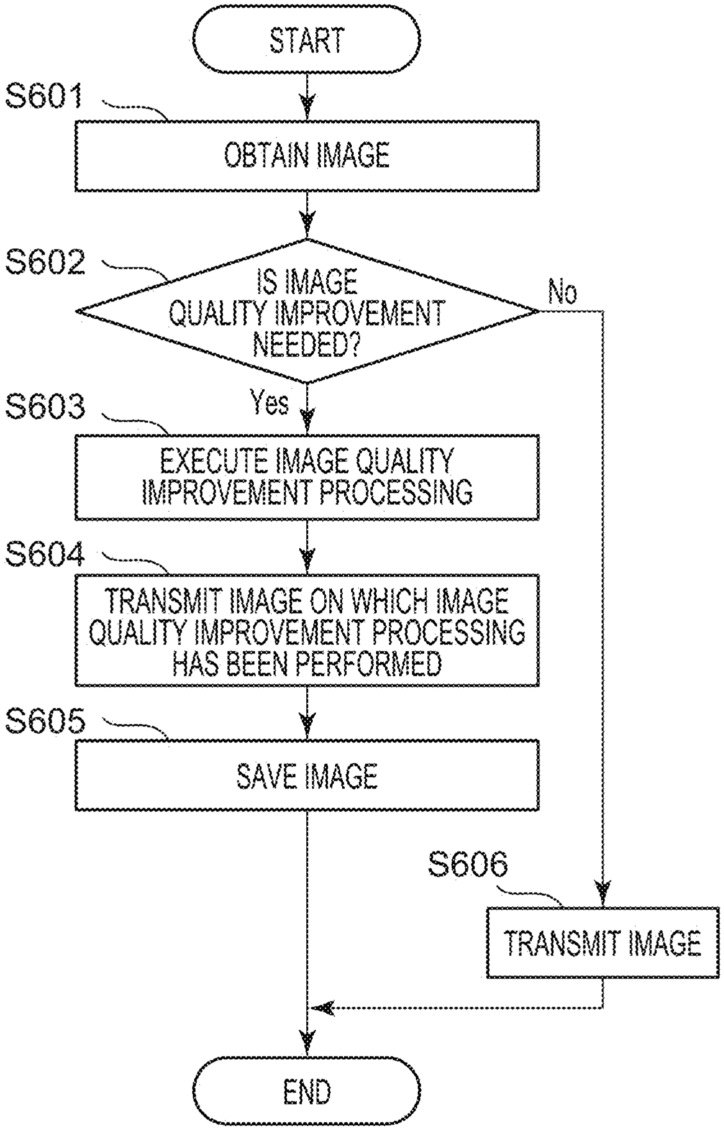
FIGS. 6A and 6B are flowcharts illustrating an operation of the information processing system.
Figure 6B:
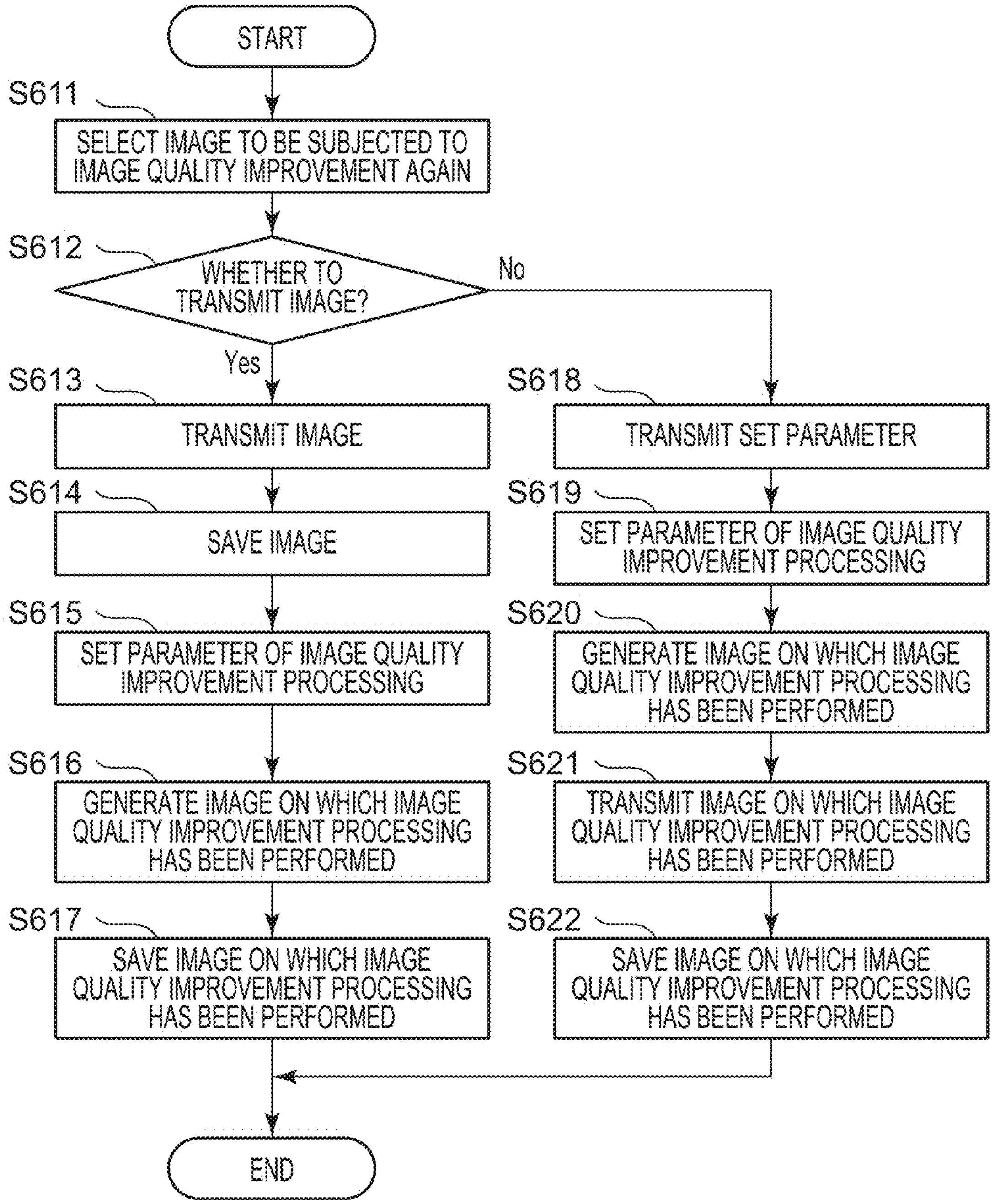

FIGS. 6A and 6B are flowcharts illustrating an operation of the information processing system 100. FIG. 6A illustrates an operation up until the images captured by the image capture apparatus 101 are transmitted to the information processing apparatus 105 via the image processing apparatus 103. FIG. 6B illustrates an operation of redoing the image quality improvement processing with respect to a selected image from among the images transmitted in FIG. 6A. The flowcharts illustrated in FIGS. 6A and 6B are realized when a CPU of the image capture apparatus 101, the image processing apparatus 103, or the information processing apparatus 105 executes a computer program.

In step S601, the image captured by the image capture apparatus 101 is obtained. The image obtained at this time can be the RAW image or can be the image on which the development processing has been performed in the image capture apparatus 101.

In step S602, it is determined whether the obtained image is an image on which the image quality improvement processing needs to be performed. This determination processing can be executed in the image capture apparatus 101 or can be executed in the image processing apparatus 103.

Examples of a determination index on whether the image quality improvement processing is needed include a standard deviation of noise in an image, a contrast, and the like. For example, in a case where the standard deviation of the noise in the image obtained in step S601 is greater than a predetermined threshold or a case where an evaluation value indicating the contrast is less than or equal to a predetermined threshold, it is determined that the image quality improvement processing needs to be performed. Based on an instruction from the user, ON/OFF of the image quality improvement processing can be switched. In the above-described case, a flag indicating whether the image quality improvement processing is to be executed is implemented, and by referring to this flag, it is determined whether the image quality improvement processing is needed (whether the image quality improvement processing is to be executed). In step S602, when it is determined that the image quality improvement processing is needed (YES in S602), the flow proceeds to step S603. When it is determined that the image quality improvement processing is not needed (NO in S602), the flow proceeds to step S606.

In step S603, the image processing apparatus 103 executes the image quality improvement processing on the image obtained in in step S601.

In step S604, the image on which the image quality improvement processing has been performed is transmitted to the information processing apparatus 105.

In step S605, the image captured by the image capture apparatus 101 is saved in the first storage device 102.

In step S606, the image captured by the image capture apparatus 101 or the image encoded by the image processing apparatus 103 is transmitted. As described above, the image captured by the image capture apparatus 101 refers to the RAW image or the image on which the development processing has been executed. Since the image is transmitted via the network 104, when a restriction on a communication bandwidth or traffic is considered, an encoded image is preferably transmitted. In a case where the image quality improvement processing is desired to be executed again in the information processing apparatus 105, the RAW image or the image on which the development processing has been performed (SDI image) needs to be transmitted. This is because in order to execute the image quality improvement processing, the RAW image or the image on which the development processing has been performed (SDI image) is to be used.

In step S611, in the information processing apparatus 105, an image on which the image quality improvement processing is to be redone is selected from among the images stored in the second storage device 108 based on an input of the user via the input apparatus 107. Meta data related to the selected image and a signal for requesting redo of the image quality improvement processing are transmitted from the information processing apparatus 105 to the image processing apparatus 103. This meta data is used to specify an image corresponding to the selected image from among the images stored in the first storage device 102. The meta data is used to specify the original image (image before the image quality improvement processing is executed) corresponding to the selected image. Content of the meta data can be any data that can be used to specify the original image corresponding to the selected image. For example, an identification number or a time stamp associated with each image or the like can be used as the meta data.

In step S612, based on the request received from the information processing apparatus 105, it is determined whether the image stored in the first storage device 102 is to be transmitted to the information processing apparatus 105. This determination can be performed manually by the user or can be performed based on a load applied to the network 104 that is calculated based on a traffic state of the network 104 and a size of the image. For example, in a case where the load applied to the network 104 does not exceed a predetermined load, it is determined that the image stored in the first storage device 102 is to be transmitted. Alternatively, whether an amount of data of the image to be transmitted is less than or equal to a predetermined amount can be determined, and it can be determined that the image is to be transmitted in a case where the amount of data is less than or equal to the predetermined amount. In a case where the image to be transmitted includes a plurality of images, the load or the amount of data is calculated based on the number of images or the traffic in total. When it is determined that the image is to be transmitted, the flow proceeds to step S613. When it is determined that the image is not to be transmitted, the flow proceeds to step S618. The image stored in the first storage device 102 is an image captured by the image capture apparatus 101 and is an image that is not yet to be encoded (for example, a RAW image). Therefore, as compared with the encoded image, the data size of the image is larger and the load applied to the network 104 caused by the image transmission is also larger. The processing in step S612 is processing to transmit the image that is not yet to be encoded such that the load applied to the network 104 does not exceed the predetermined load.

In step S613, the image corresponding to the image selected by the information processing apparatus 105 from among the images stored in the first storage device 102 is transmitted to the information processing apparatus 105. As described above, specification of the image to be transmitted is performed by using the meta data obtained from the information processing apparatus 105. The image can also be specified based on an instruction from the user. For example, an image captured at a specified time and date or during a specified period from among the images stored in the first storage device 102 can be transmitted.

In step S614, the image received by the information processing apparatus 105, that is, the image read out from the first storage device 102, is stored in the second storage device 108.

In step S615, a parameter to be used to redo the image quality improvement processing is set. As the parameter for the redo, for example, a parameter input by the user is used.

In step S616, the image processing unit 503 in the information processing apparatus 105 executes on the image quality improvement processing the received image based on the parameter set in step S615 to generate the image on which the image quality improvement processing has been executed. That is, redo of the image quality improvement processing is executed in the information processing apparatus 105.

In step S617, the image on which the image quality improvement processing has been executed is stored in the second storage device 108. At the time of storage, the image can be stored by overwriting the image selected in step S611 or can be stored together (without overwriting) in association with the selected image. The selected image and the image on which the image quality improvement processing has been redone can also be displayed next to each other to enable the user to select an image to be stored.

In step S618, a parameter for redoing the image quality improvement processing is transmitted from the information processing apparatus 105 to the image processing apparatus 103. In step S619, the parameter for redoing the image quality improvement processing is set in the image processing apparatus 103 based on the received parameter.

In step S620, redo of the image quality improvement processing based on the set parameter is executed on the image corresponding to the image selected in step S611 from among the images stored in the first storage device 102. A difference between step S616 and step S620 is that the image quality improvement processing is to be executed in the image processing apparatus 103 or executed in the information processing apparatus 105.

In step S621, the compression processing is further executed on the image on which the image quality improvement processing has been executed in the image processing apparatus 103 to reduce the amount of data of the image to be transmitted. The image is then transmitted to the information processing apparatus 105.

In step S622, the image received from the image processing apparatus 103 is received by the information processing apparatus 105 and stored in the second storage device 108. Similarly as in step S617, the image can be saved by way of overwrite or can be saved together.

Figure 7:
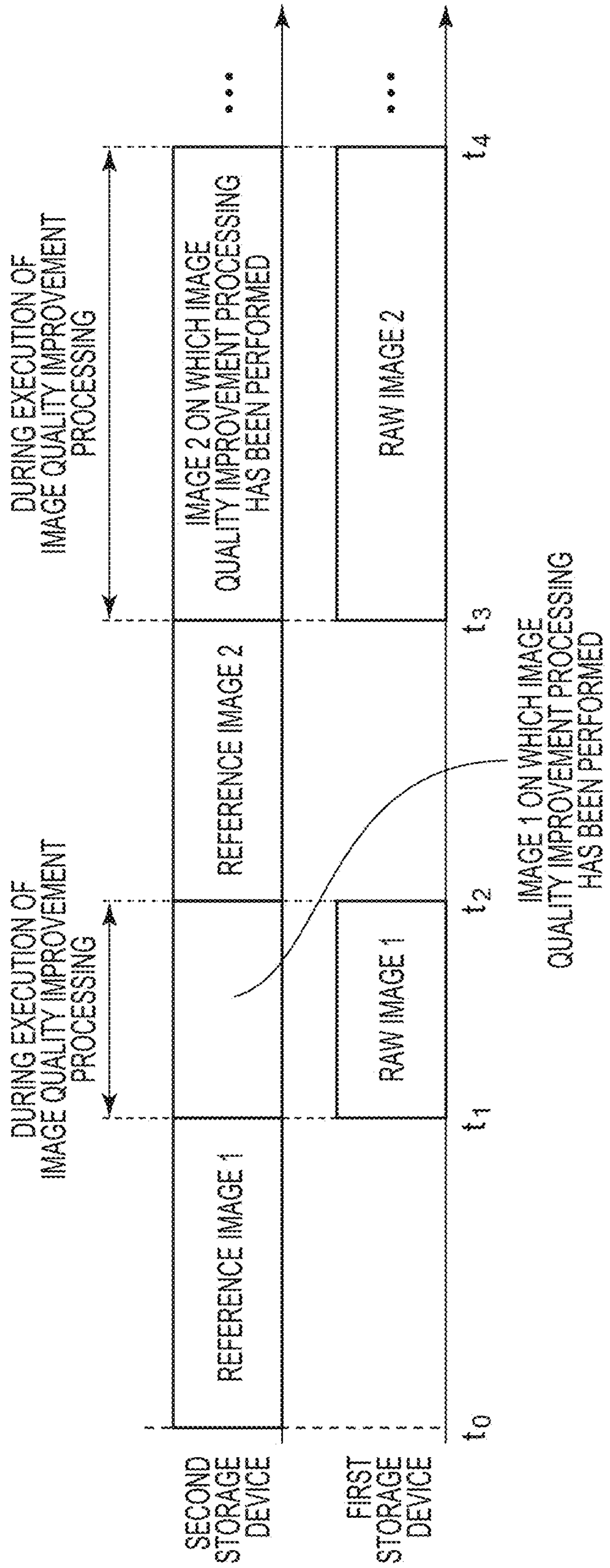
FIG. 7 illustrates images to be stored in storage devices and storage timing.

FIG. 7 illustrates an example of images to be saved in the first storage device 102 and the second storage device 108 and saving timing in the information processing system 100 according to the present embodiment. A horizontal axis represents a time axis, and each of $t_0$ to $t_4$ indicates a point in time at certain timing. A reference image in FIG. 7 is an image captured by the image capture apparatus 101 on which the development processing has been performed. The image is preferably an image on which the encoding processing has been performed. That is, the reference image refers to an image to be transmitted in step S606.

At a point in time between $t_0$ and $t_1$, since it is determined that the image quality improvement processing is not needed, a reference image 1 is transmitted, and the image is saved only in the second storage device 108. At a point in time between $t_1$ and $t_2$, since it is determined that the image quality improvement processing is needed, a RAW image 1 is saved in the first storage device 102, and an image 1 on which the image quality improvement processing has been performed is saved in the second storage device 108. At a point in time between $t_2$ and $t_3$, since it is determined that the image quality improvement processing is not needed, only a reference image 2 is saved in the second storage device 108. At a point in time between $t_3$ and $t_4$, since it is determined that the image quality improvement processing is needed, a RAW image 2 is saved in the first storage device 102, and an image 2 on which the image quality improvement processing has been performed is saved in the second storage device 108. The RAW image to be saved can be an image on which the development processing has been performed or can be, for example, an image to be output through the SDI.

In this manner, the information processing system 100 according to the present embodiment stores the original image (the RAW image or the SDI image) corresponding to the image on which the image quality improvement processing has been executed in the first storage device 102.

Thus, it is possible to provide an information processing system that can reduce a necessary storage capacity compared to a case where all the images are to be stored and can redo the image quality improvement processing. It is not necessary to store an image on which the image quality improvement processing has not been executed. This is because a likelihood that the image quality improvement is to be redone on the image on which the image quality improvement processing is not needed is lower than that of the image on which the image quality improvement processing has been executed. Depending on the parameter setting, the image on which the image quality improvement processing has been performed can need redo of the image quality improvement processing due to a factor such as an under correction or an over correction.

The image capture apparatus 101, the first storage device 102, the image processing apparatus 103 according to the present embodiment can all be integrated into a single entity. In the above-described case, each operation in the flowchart illustrated in FIG. 6A can be executed by a single image capture apparatus that includes an obtaining unit, an image processing unit, a decision unit, and a storage unit as described above.

Second Embodiment

There can be a case where a check or an analysis of the monitoring target is not satisfactorily performed in the image on which the image quality improvement has not been performed as described in the first embodiment due to a factor that the contrast has slightly decreased or the like. According to the present embodiment, a case will be described where an image on which the image quality improvement processing has not been performed that is an image on which the image quality improvement processing is likely to be performed is also stored in the first storage device 102.

Since a system configuration of the information processing system 100 according to the present embodiment and a hardware configuration and a functional configuration are similar to those of the first embodiment, the descriptions thereof are not repeated.

Figure 8:
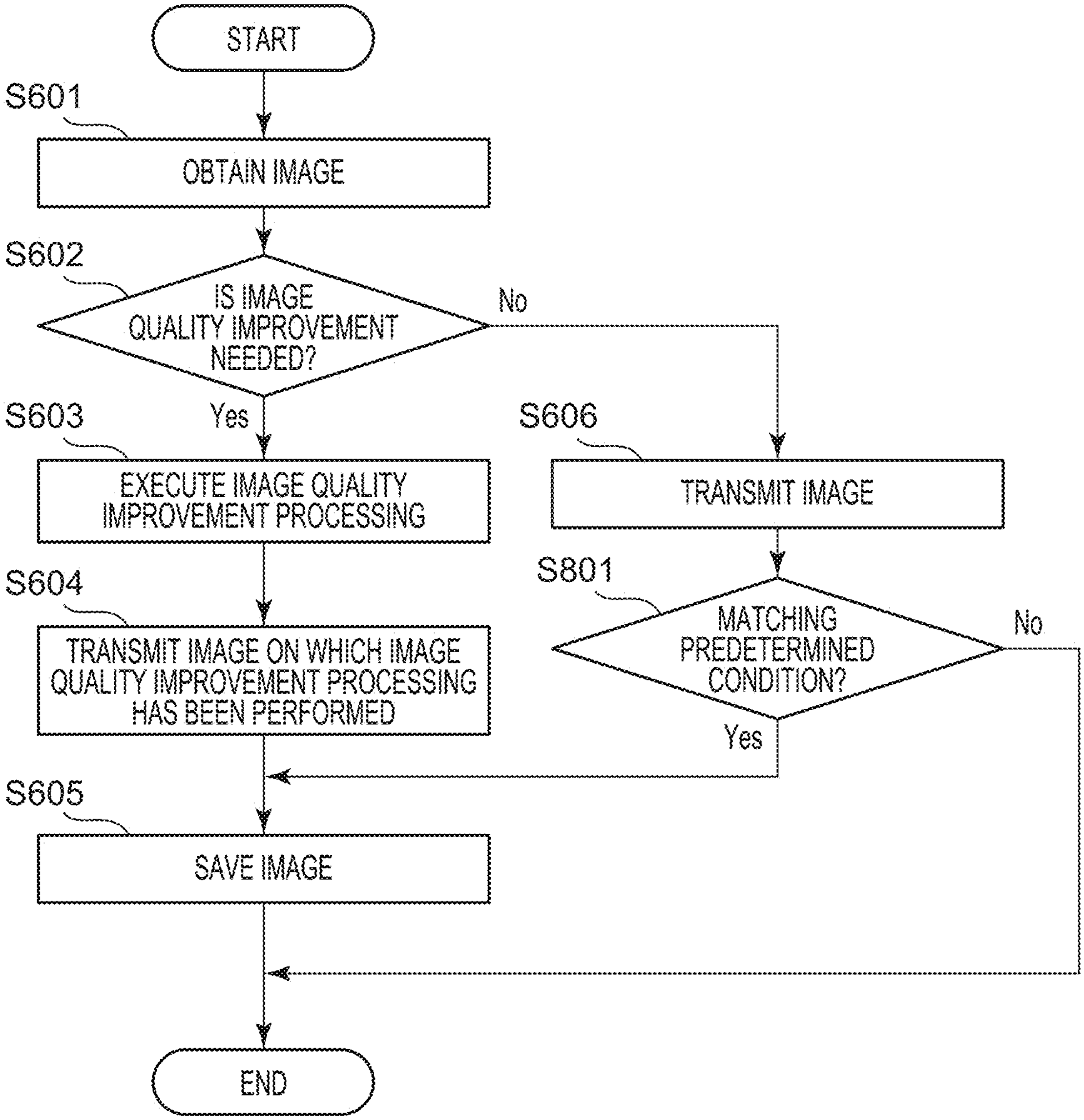
FIG. 8 is a flowchart illustrating the operation of the information processing system.

FIG. 8 is a flowchart illustrating the operation of the information processing system 100 according to the present embodiment. The descriptions of operations similar to those in the flowchart according to the first embodiment are not repeated. Since the operation illustrated in FIG. 8 corresponds to the operation illustrated in FIG. 6A, and the operation corresponding to FIG. 6B in the present embodiment is the same, the descriptions thereof are not repeated. The flowchart illustrated in FIG. 8 is realized when a computer program is executed by the CPU of any of the image capture apparatus 101, the image processing apparatus 103, and the information processing apparatus 105.

In step S801, it is determined whether the image for which it is determined in step S606 that the image quality improvement processing is not needed matches a predetermined condition. Herein, the predetermined condition includes an occasion where the gain becomes a particular gain or higher and an occasion where the contrast evaluation value becomes a predetermined value or higher. In addition, the predetermined condition includes an occasion where a size of the subject in the image is a predetermined value or smaller and an occasion where a telephoto setting is set for the image capture apparatus 101. Under such a condition, the user who browses the image may desire the image quality improvement.

To enable implementation of the image quality improvement processing later, the image is preferably stored in the first storage device 102. When it is determined in step S801 that the predetermined condition is met, the flow proceeds to step S605, and the image captured by the image capture apparatus 101 is saved in the first storage device 102.

Figure 9:
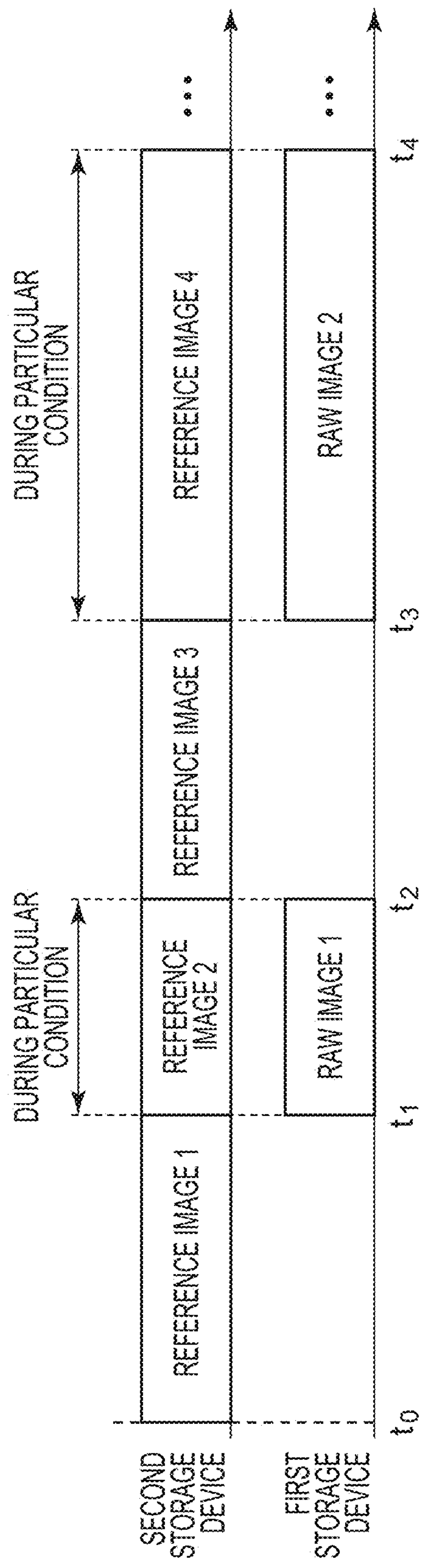
FIG. 9 illustrates images to be stored in the storage devices and storage timing.

FIG. 9 is a diagram illustrating images to be saved in the first storage device 102 and the second storage device 108 and saving timing according to the present embodiment. A horizontal axis represents a time axis, and each of $t_0$ to $t_4$ indicates a point in time at certain timing.

With reference to FIG. 9, examples of RAW images and saving destinations and saving timing of reference images in the present embodiment are illustrated. At a point in time between $t_0$ and $t_1$, since it is determined that the image quality improvement processing is not needed, only the reference image 1 is saved in the second storage device 108. At a point in time between $t_1$ and $t_2$, since it is determined that although the image quality improvement processing is not needed, the image quality improvement processing is likely to be executed, the RAW image 1 is saved in the first storage device 102, and the reference image 2 is saved in the second storage device 108. At a point in time between $t_2$ and $t_3$, since it is determined that the image quality improvement processing is not needed, only a reference image 3 is saved in the second storage device 108. At a point in time between $t_3$ and $t_4$, since it is determined that although the image quality improvement processing is not needed, the image quality improvement processing is likely to be executed, the RAW image 2 is saved in the first storage device 102, and a reference image 4 is saved in the second storage device 108.

The information processing system according to the present embodiment enables executing the image quality improvement processing on the image with an unsatisfactory visibility with regard to the image on which the image quality improvement processing has not been performed too. Since only the images matching the predetermined condition are stored, it does not take up more storage space than necessary, and it is possible to reduce the necessary storage capacity for storing the images before the image quality improvement processing is executed.

Third Embodiment

According to a third embodiment, processing of transmitting the saved RAW image according to the first embodiment or the second embodiment to the information processing apparatus 105 at predetermined timing will be described. One example of the predetermined timing is timing at which the user desires to redo the image quality improvement processing. In a case where the user requests the redo of the image quality improvement processing, the transmission of the RAW image is prioritized over a congested state of a network. Other timing includes timing at which the network is not congested. In a case where the RAW image is transmitted via the network, a load is applied to the network, so that the RAW image is transmitted at timing at which the load on the network is reduced.

Since a system configuration of the information processing system 100 according to the present embodiment and a hardware configuration and a functional configuration are similar to those of the first embodiment, the descriptions thereof are not repeated.

Figure 10:
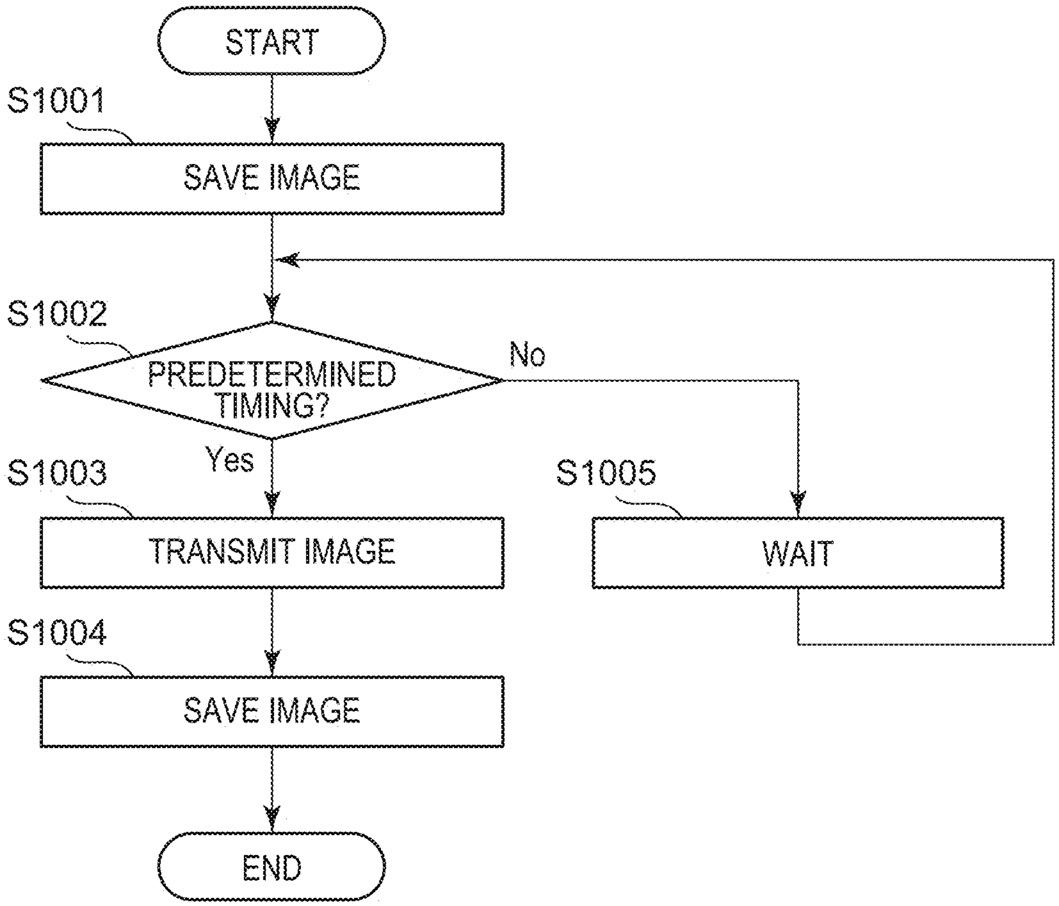
FIG. 10 is a flowchart illustrating a control method for timing at which an image is to be transmitted.

FIG. 10 is a flowchart illustrating a flow of processing in the information processing system according to the present embodiment. The flowchart illustrated in FIG. 10 is realized when the computer program is executed by the CPU of any of the image capture apparatus 101, the image processing apparatus 103, and the information processing apparatus 105.

Step S1001 is a step of saving, in the first storage device 102, the RAW image during a period in which the image quality improvement processing is executed according to the first embodiment or the second embodiment or a period in which it is determined that the image quality improvement processing is likely to be implemented.

In step S1002, it is determined whether a current point in time is predetermined timing. Herein, the predetermined timing includes a time when the network 104 is not congested, a time when the user designates the timing, a time when real time monitoring is not implemented, or the like.

In step S1003, all the RAW images saved in the first storage device 102 are transmitted to the information processing apparatus 105 via the network 104 when it is determined in step S1002 that the current point in time is the predetermined timing. Herein, the RAW images saved in the first storage device 102 can be deleted upon completion of the transmission.

In step S1004, all the RAW images received by the information processing apparatus 105 via the network 104 are saved in the second storage device 108.

In step S1005, when it is not determined in S1002 that the current point in time is not the predetermined timing, after waiting for a predetermined period of time, the processing in S1002 is implemented again. Herein, the predetermined period of time can be automatically set or can be freely set by the user.

As described above, it is possible to improve the usability for the user and reduce the load on the network by transmitting the RAW image to the information processing apparatus 105 at the timing desired by the user or the timing at which the network is not congested.

Fourth Embodiment

According to a fourth embodiment, descriptions will be provided of processing of appending, when a RAW image is to be saved, an image analysis result to the RAW image by the user and then saving the RAW image for a purpose of complementing the parameter setting used when the user is to execute the image quality improvement processing again.

The image analysis result includes information such as the analysis result of the reference image (an average luminance, a contrast, or the like), the parameter setting used when the image quality improvement processing has been performed, and other parameter setting candidates. By checking the image analysis result appended to the RAW image, when the image quality improvement processing is to be executed again, the user can execute the image quality improvement processing according to the other parameter setting candidates included in the image analysis result and can also perform the appropriate parameter setting by themselves based on the analysis result of the reference image.

Since a system configuration of the information processing system 100 according to the present embodiment and a hardware configuration and a functional configuration are similar to those of the first embodiment, the descriptions thereof are not repeated.

Figure 11:
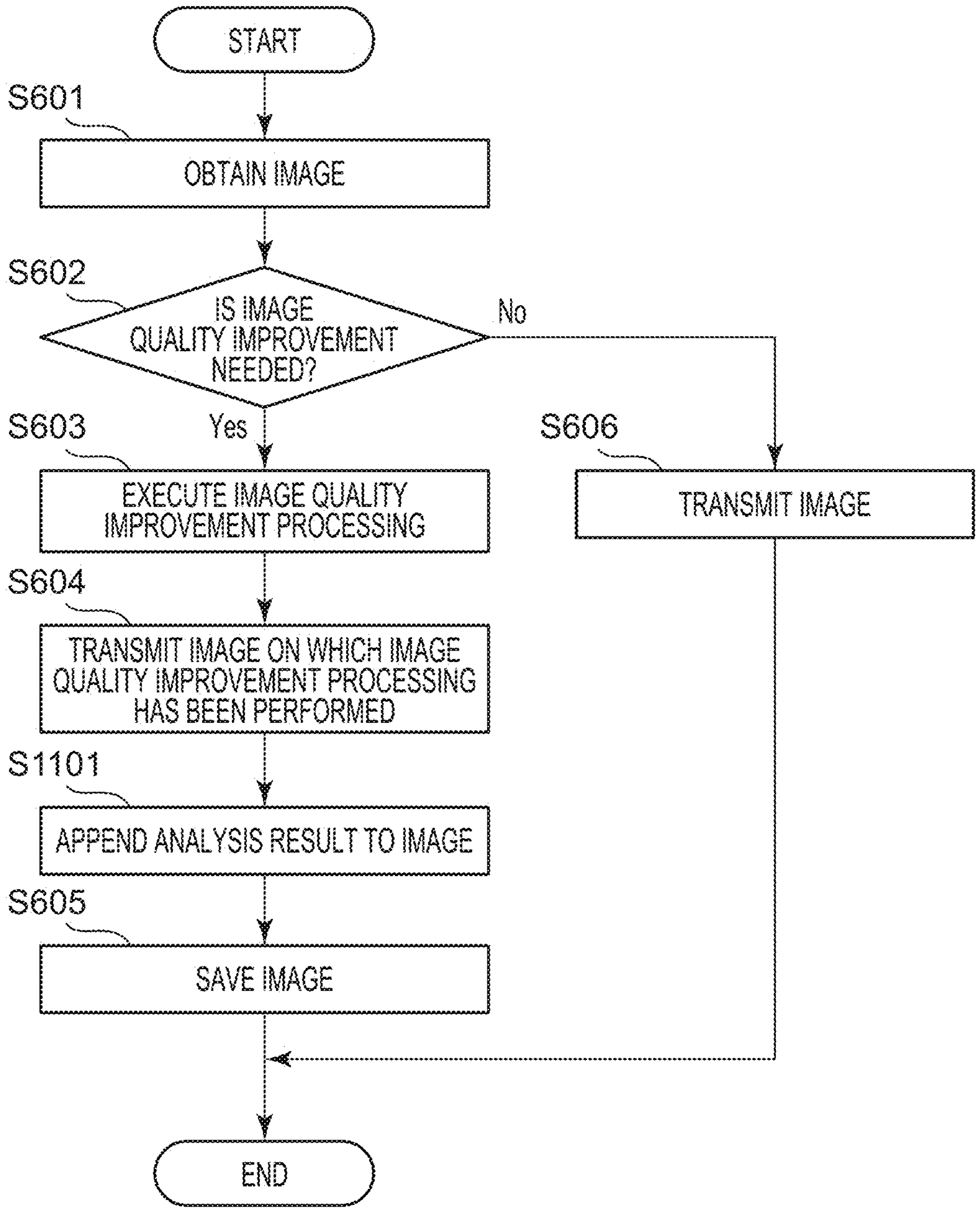
FIG. 11 is a flowchart illustrating the operation of the information processing system.

FIG. 11 is a flowchart illustrating a flow of processing of the information processing system 100 according to the present embodiment. The same reference signs are assigned to the operations similar to those of the first embodiment from among each operation illustrated in FIG. 11, and the descriptions thereof are not repeated. The flowchart illustrated in FIG. 11 is realized when the computer program is executed by the CPU of any of the image capture apparatus 101, the image processing apparatus 103, and the information processing apparatus 105.

In step S1101, an analysis result obtained by performing an analysis by the image quality improvement decision unit 208 on the image obtained in step S601 is appended to the RAW image. Herein, information to be appended includes the image analysis result such as the average luminance or the contrast, the parameter setting of the image quality improvement processing that has been determined by the image quality improvement decision unit 208 based on the image analysis result, other candidates, and the like.

In a case where the image quality improvement processing is to be redone, the parameter setting to be processed by the image processing apparatus 103 and a processing method including model change are determined based on the parameter setting and the information obtained from the image analysis result. This processing can be automatically executed or can be displayed on a display unit (not illustrated) as a change parameter candidate for the user.

Thus, when the user checks the image analysis result appended to the RAW image, it is possible to easily perform the parameter setting for the image quality improvement processing in a short period of time.

Fifth Embodiment

According to a fifth embodiment, processing to be performed when the information processing apparatus 105 searches the second storage device 108 for an image similar to an analysis target image or an analysis result similar to the analysis result appended to the analysis target image will be described.

With regard to a target image on which redo of the image quality improvement processing is requested by the user, a case will be considered where redo of the image quality improvement processing has been performed in the past on an image captured with a camera setting and an angle of view of the camera under an environment which are similar to those of the target image. In the above-described case, it is conceivable that the used parameter setting can support the image quality improvement processing on the target image too. In view of the above, in a case where an image on which the image quality improvement processing is desired to be redone exists, the image similar to the analysis target image or the analysis result similar to the analysis result appended to the analysis target image is searched for from the second storage device 108, so that the image quality improvement processing is executed based on the parameter setting appended to the image.

Figure 12:
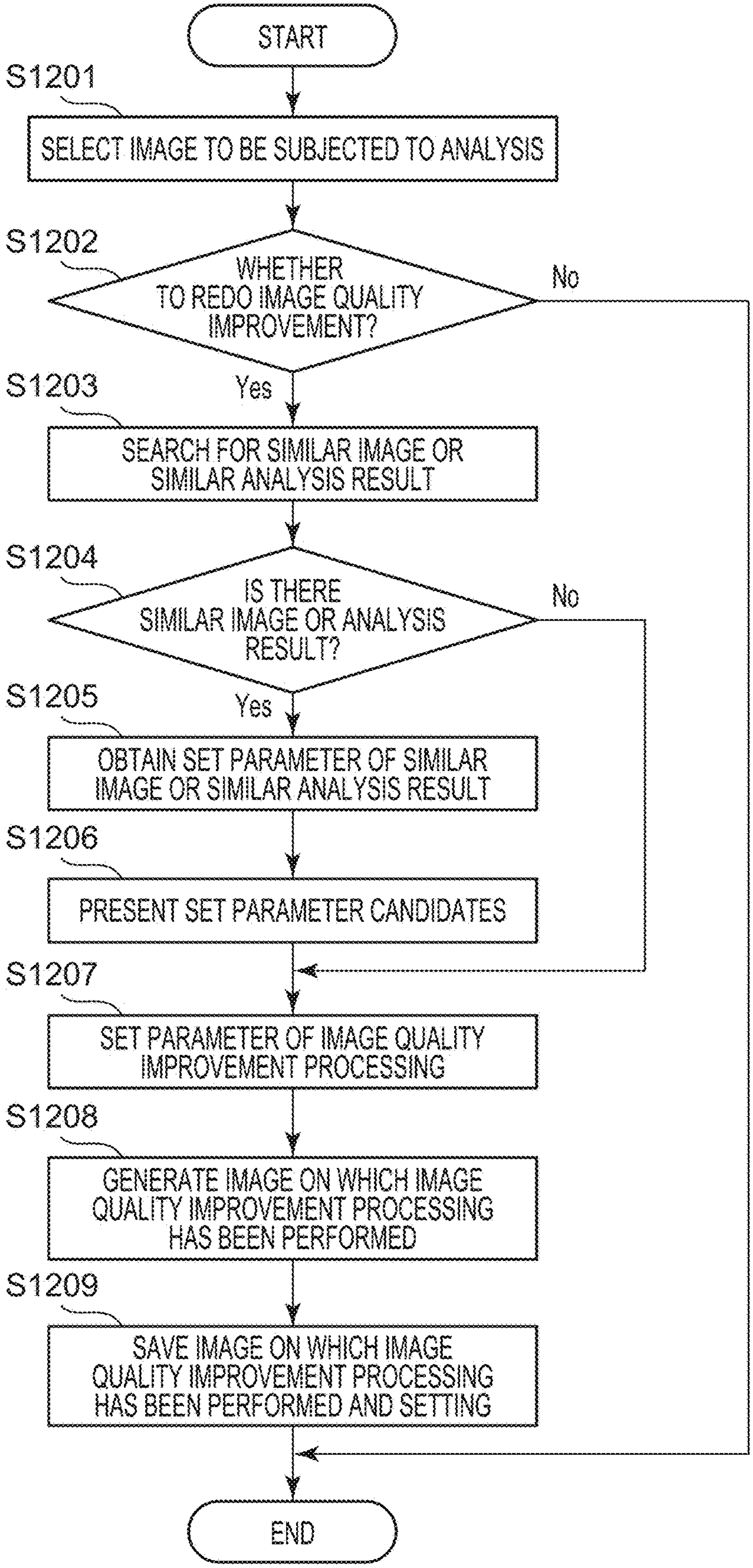
FIG. 12 is a flowchart illustrating an operation of redoing image quality improvement processing.

FIG. 12 is a flowchart illustrating a flow of processing of the information processing apparatus 105 according to the present embodiment. An operation illustrated in the present flowchart is realized when a program is executed by the CPU 401 in the information processing apparatus 105.

In step S1201, an image to be subjected to the analysis is selected from among the images on which the image quality improvement processing has been performed that are saved in the second storage device 108.

In step S1202, whether redo of the image quality improvement processing is needed is determined. The determination on whether the image quality improvement processing is to be redone can be performed based on an instruction from the user or can be performed based on a parameter indicating a visibility of the image. The parameter indicating the visibility is, for example, a contrast evaluation value or the like. In a case where the parameter indicating the visibility is less than a predetermined threshold, it is determined that the redo of the image quality improvement processing is needed. When it is determined that the redo of the image quality improvement processing is needed, the flow proceeds to step S1203.

In step S1203, the image similar to the analysis target image or the analysis result similar to the analysis result appended to the analysis target image is searched for from the images on which the image quality improvement processing has been performed that are saved in the second storage device 108. The present processing is executed by the search unit 505.

In step S1204, it is determined whether the image similar to the analysis target image or the analysis result similar to the analysis result appended to the analysis target image has been checked. In a case where the similar image or analysis result exists, the flow proceeds to step S1205.

In step S1205, the parameter setting candidates used when the image quality improvement processing linked to the target image has been implemented are obtained.

In step S1206, the parameter setting candidates obtained in step S1205 are presented. For example, the display apparatus 106 is caused to display the parameter setting candidates.

In step S1207, the user sets the parameter selected from among the presented parameter setting candidates or the parameter separately set by the user as the parameter to be used at the time of execution of the image quality improvement processing.

In step S1208, the image processing unit 503 in the information processing apparatus 105 executes the image quality improvement processing following the set parameter. The image on which the image quality improvement processing is to be performed is an image corresponding to the analysis target image from among the images stored in the first storage device 102 or the second storage device 108.

In step S1209, the image on which the image quality improvement processing has been performed and the parameter setting at the time of implementation of the image quality improvement processing are saved in the second storage device 108 while being linked to each other.

Thus, by making it possible to check the image similar to the analysis target image or the analysis result similar to the analysis result appended to the analysis target image, the parameter setting by the user when the image quality improvement processing is to be executed again can be supported.

Sixth Embodiment

According to a sixth embodiment, processing of reflecting a tendency of past image quality improvement reprocessing upon implementation of real time image quality improvement processing will be described.

For the image quality improvement processing automatically performed in real time, the similar image quality improvement processing is executed under the same environment as long as a trained model is not updated or switched. For example, a case will be considered where an intensity of the image quality improvement processing has been weak when the image quality improvement processing has been performed under a particular environment. In this case, as long as the environment is the same, the image quality improvement intensity tends to be weak for any images. In a case where the user requests redo of the image quality improvement processing for this image on which the image quality improvement processing has been performed, redo of the image quality improvement processing occurs for all the images captured under the particular environment to cause a large amount of rework. To deal with the above-described case, in a case where it is already found out that the intensity of the image quality improvement processing performed under the particular environment in the past tends to be weak, when the real time image quality improvement processing is to be executed, the intensity is increased for the execution. In this manner, the tendency in the redo of the image quality improvement processing performed in the past is reflected on the real time image quality improvement processing. A hardware configuration and a functional configuration of each apparatus constituting the information processing system according to the present embodiment are similar to those of the first embodiment, and therefore the descriptions thereof are not repeated.

Figure 13:
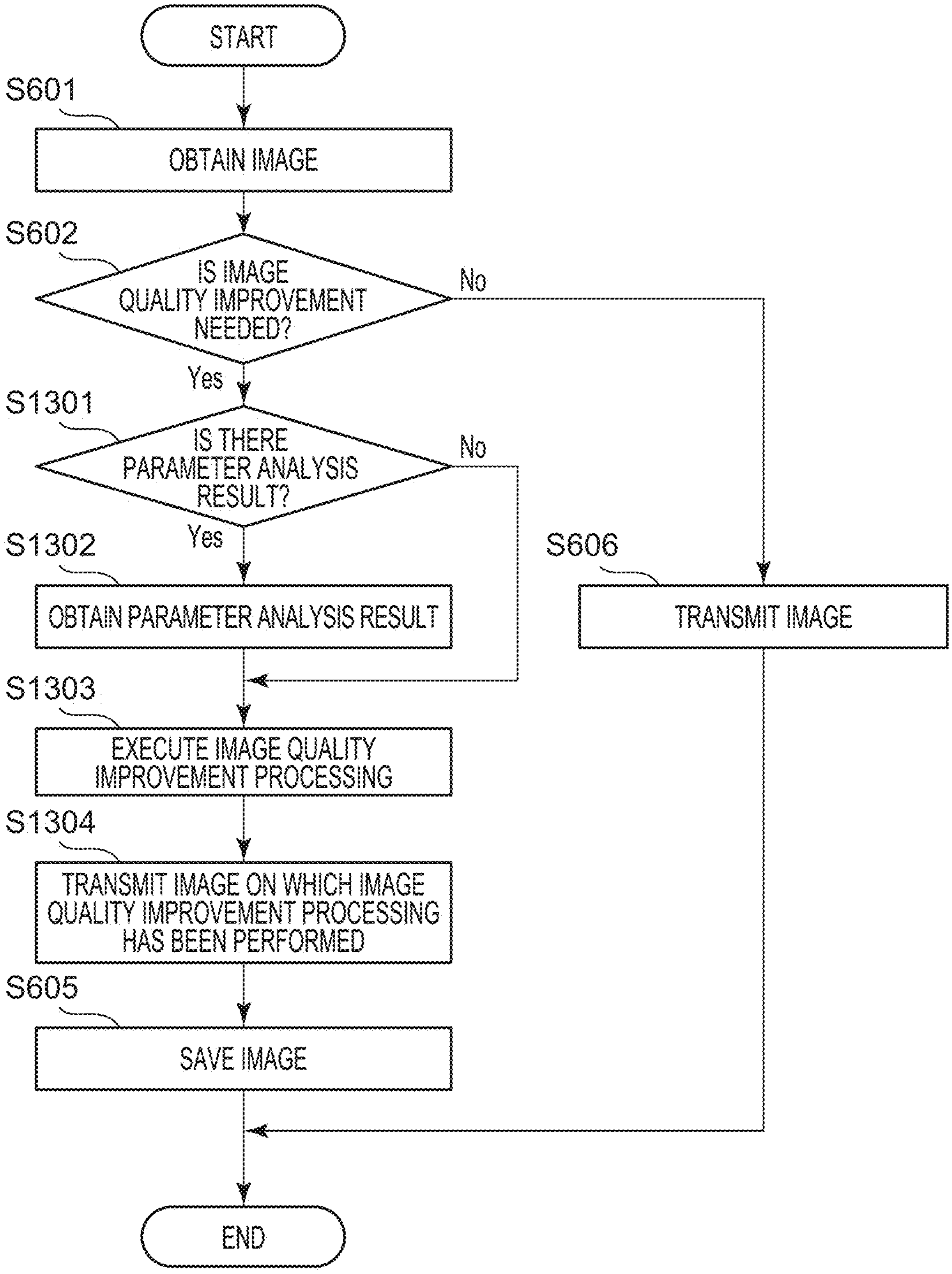
FIG. 13 is a flowchart illustrating the operation of the information processing system.

FIG. 13 is a flowchart illustrating the operation of the information processing system 100 according to the present embodiment. The same reference signs are assigned to the operations similar to those of the first embodiment in the flowchart illustrated in the present embodiment, and the descriptions thereof are not repeated.

As illustrated in FIG. 13, a difference of the present embodiment from the first embodiment resides in an operation in steps S1301 to S1304.

In step S1301, whether a parameter analysis result exists in the first storage device 102 is determined. Herein, the parameter analysis result refers to information including the parameter setting at the time of execution of the image quality improvement processing or an intensity correction degree of the image quality improvement processing. The search unit 505 performs an analysis at predetermined timing on the images on which the image quality improvement reprocessing has been performed that are accumulated in the second storage device 108 and saves the parameter analysis results in the first storage device 102. In addition, the predetermined timing refers to periodic timing, such as every hour or every day, or timing designated by the user. In a case where the parameter analysis result exists, the flow proceeds to step S1302.

In step S1302, the parameter analysis result is obtained from the first storage device 102.

In step S1303, the image processing apparatus 103 executes the image quality improvement processing based on the parameter analysis results. For example, a case will be described where such a statistical result is included that the image quality improvement reprocessing with a decreased intensity is executed on the image on which the image quality improvement processing has been performed and which have been obtained under an environment with a low luminance. In this case, at the time of the real time image quality improvement processing executed under the environment with the low luminance, a correction of decreasing the intensity can be executed for the determined parameter setting. In this manner, the parameter used to redo the image quality improvement processing and a change tendency from the parameter used to perform the previous image quality improvement processing are stored by being linked to each other. In addition, the parameter related to the image including the luminance information or the like at the time of execution of redo of the image quality improvement processing and the above-mentioned change tendency are stored by being linked to each other. These are then fed back as the parameter analysis results to the parameter setting at the time of redo of the image quality improvement processing. These analyses can be realized by a learning model trained by machine learning. That is, the machine learning is executed by setting the luminance information of the image and the above-described change tendency as training data to cause the trained model to set the parameter to be used for the redo of the image quality improvement processing.

Thus, since the tendency of the image quality improvement reprocessing implemented in the past can be reflected on the real time image quality improvement processing, the user can be saved from the trouble of executing the image quality improvement again, and the image with the image quality desired by the user on which the image quality improvement processing has been performed can be obtained in real time.

OTHER EMBODIMENTS

Examples of embodiments have been described above in detail, but the present disclosure can include, for example, an embodiment as a system, an apparatus, a method, a program, a recording medium (storage medium), or the like. Specifically, the present disclosure can be applied to a system including a host computer, an interface device, an image capture apparatus, a web application, or the like or can be applied to an apparatus including a single device.

An embodiment of the present disclosure can be realized by a recording medium (or a storage medium) having recorded thereon a program code (computer program) of software that realizes the above-described function of the embodiments is supplied to a system or an apparatus. The storage medium is a computer-readable storage medium. A computer (or a CPU or an MPU) of the system or the apparatus reads out and executes the program code stored in the recording medium. In this case, the program code itself read out from the recording medium realizes the above-described function of the embodiments, and the recording medium having recorded thereon the program code can be implemented as the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-200150, filed Nov. 27, 2023, which is hereby incorporated by reference herein in its entirety.

What is claimed is:

1. An information processing system comprising:

an image processing apparatus configured to execute image processing to improve an image quality of an image captured by an image capture apparatus; and a first storage device, wherein the image processing apparatus is configured to determine whether the image processing is to be executed, wherein, in a case where it is determined that the image processing is to be executed, the image processing apparatus is configured to transmit, via a network, an image on which the image processing has been executed, and the first storage device is configured to store an original image that is an image before the image processing is executed, the original image being stored so as to be available to be read out based on a later request to redo the image processing, and wherein, in a case where it is determined that the image processing is not to be executed, the image processing apparatus is configured to transmit, via the network, an image on which the image processing has not been executed, and the first storage device is configured to refrain from writing the original image to the first storage device.

2. The information processing system according to claim 1, wherein whether the image processing is to be executed is determined based on the captured image.

3. The information processing system according to claim 2, wherein whether the image processing is to be executed is determined based on a parameter related to noise of the captured image.

4. The information processing system according to claim 1, wherein whether the image processing is to be executed is determined based on a request from the image capture apparatus or an information processing apparatus.

5. The information processing system according to claim 1, wherein the image processing is executed on the image stored in the first storage device based on a request from an information processing apparatus.

6. The information processing system according to claim 1, wherein the image processing apparatus executes compression processing on the captured image or the image on which the image processing has been executed, and the image on which at least one of the image processing or the compression processing has been executed or the image on which the image processing or the compression processing has not been executed is transmitted.

7. The information processing system according to claim 1, wherein the captured image includes a plurality of images, and an image for which it has been determined that the image processing is not to be executed that is an image that meets a predetermined condition from among the plurality of images captured by the image capture apparatus is stored in the first storage device.

8. The information processing system according to claim 7, wherein the predetermined condition is a condition related to at least one of a gain, a contrast, a fluctuation, or a size of a subject of the image captured by the image capture apparatus.

9. The information processing system according to claim 7, wherein the predetermined condition is whether a gain or an amount of noise of the captured image is greater than or equal to a threshold.

10. The information processing system according to claim 1, wherein the captured image is transmitted at a predetermined timing.

11. The information processing system according to claim 10, further comprising:

a second storage device configured to store the transmitted image; and an information processing apparatus communicating with the image processing apparatus via a network, wherein the information processing apparatus executes image processing to improve an image quality on the image stored in the second storage device based on an instruction input to an input apparatus.

12. The information processing system according to claim 1, wherein the captured image is deleted when it is determined that the image processing is not to be executed.

13. An image capture apparatus comprising:

an image capture element;

at least one memory storing instructions; and at least one processor that, upon execution of the stored instructions, causes the at least one processor to:

output an image captured by the image capture element to an image processing apparatus that executes image processing to improve an image quality;

obtain information indicating whether the image processing is to be executed on the captured image, wherein, in a case where it is determined that the image processing is to be executed, the image processing apparatus is configured to transmit, via a network, an image on which the image processing has been executed, and a first storage device is configured to store an original image that is an image before the image processing is executed, the original image being stored so as to be available to be read out based on a later request to redo the image processing, and wherein, in a case where it is determined that the image processing is not to be executed, the image processing apparatus is configured to transmit, via the network, an image on which the image processing has not been executed, and the first storage device is configured to refrain from writing the original image to the first storage device.

14. An information processing method comprising:

obtaining an image;

determining whether image processing to improve an image quality is to be executed on the obtained image; and storing the obtained image when it is determined that the image processing is to be executed, wherein, in a case where it is determined that the image processing is to be executed, an image processing apparatus is configured to transmit, via a network, an image on which the image processing has been executed, and a first storage device is configured to store an original image that is an image before the image processing is executed, the original image being stored so as to be available to be read out based on a later request to redo the image processing, and wherein, in a case where it is determined that the image processing is not to be executed, the image processing apparatus is configured to transmit, via the network, an image on which the image processing has not been executed, and the first storage device is configured to refrain from writing the original image to the first storage device.

15. A non-transitory computer-readable storage medium storing a program for causing a computer to execute a method, the method comprising:

obtaining an image;

determining whether image processing to improve an image quality is to be executed on the obtained image; and storing the image obtained in the obtaining when it is determined that the image processing is to be executed, wherein, in a case where it is determined that the image processing is to be executed, an image processing apparatus is configured to transmit, via a network, an image on which the image processing has been executed, and a first storage device is configured to store an original image that is an image before the image processing is executed, the original image being stored so as to be available to be read out based on a later request to redo the image processing, and wherein, in a case where it is determined that the image processing is not to be executed, the image processing apparatus is configured to transmit, via the network, an image on which the image processing has not been executed, and the first storage device is configured to refrain from writing the original image to the first storage device.

* * * * *